US010445400B2

(12) United States Patent
Taubin

(10) Patent No.: US 10,445,400 B2
(45) Date of Patent: *Oct. 15, 2019

(54) NON-CONVEX HULL SURFACES

(71) Applicant: Brown University, Providence, RI (US)

(72) Inventor: Gabriel Taubin, Providence, RI (US)

(73) Assignee: Brown University, Providence, RI (US)

( * ) Notice: Subject to any disclaimer, the term of this patent is extended or adjusted under 35 U.S.C. 154(b) by 1089 days.

This patent is subject to a terminal disclaimer.

(21) Appl. No.: 14/526,047

(22) Filed: Oct. 28, 2014

(65) Prior Publication Data

US 2015/0120260 A1 Apr. 30, 2015

Related U.S. Application Data

(60) Provisional application No. 61/896,300, filed on Oct. 28, 2013.

(51) Int. Cl.
*G06F 17/10* (2006.01)
(52) U.S. Cl.
CPC .................................. *G06F 17/10* (2013.01)
(58) Field of Classification Search
None
See application file for complete search history.

(56) References Cited

U.S. PATENT DOCUMENTS

2009/0171627 A1* 7/2009 Olson .................... G06T 17/00
703/1

OTHER PUBLICATIONS

F. Calakli, SSD: Smooth signed distance surface reconstruction, Nov. 7, 2011, Pacific Graphics 2011, vol. 30, pp. All.*
Adamson et al., "Approximating and Intersecting Surfaces from Points", Eurographics Symposium on Geometry Processing, The Eurographics Association, 2003, pp. 230-239.
Alexa et al., "Point Set Surfaces", IEEE Visualization, 2001, pp. 21-28.
Alexa et al., "Computing and Rendering Point Set Surfaces", IEEE Transactions on Visualization and Computer Graphics, vol. 9, No. 1, Jan.-Mar. 2003, pp. 3-15.
Alliez et al., "Voronoi-Based Variational Reconstruction of Unoriented Point Sets", Eurographics Symposium on Geometry Processing, Eurographics Association, 2007, 10 pages.
Amenta et al., "Surface Reconstruction by Voronoi Filtering", ACM, 1998, pp. 39-48.
Amenta et al., "The Power Crust, Unions of Balls, and the Medial Axis Transform", Computational Geometry Theory and Applications, vol. 19, 2001, pp. 127-153.
Amenta et al., "The power crust", ACM, 2011, pp. 249-260.

(Continued)

*Primary Examiner* — Syed A Roni
(74) *Attorney, Agent, or Firm* — Adler Pollock & Sheehan P.C.

(57) ABSTRACT

The invention is a computer implemented method, device, system, or article for reconstructing a surface of an object. In particular, the invention comprises estimating a non-convex hull signed distance function parameters from a data set of an object and evaluating the non-convex hull signed distance function on vertices of a volumetric mesh. The invention further comprises approximating the zero level set of the non-convex hull signed distance function by a polygonal mesh using an isosurface algorithm to provide surface reconstruction of an object.

20 Claims, 16 Drawing Sheets

(56) References Cited

OTHER PUBLICATIONS

Bernardini et al., "The Ball-Pivoting Algorithm or Surface Reconstruction", IEEE Transactions on Visualization and Computer Graphics, vol. 5, No. 4, Oct.-Dec. 1999, pp. 349-359.

Bolle et al., "On Three-Dimensional Surface Reconstruction Methods", IEEE Transactions on Pattern Analysis and Machine Intelligence, vol. 13, No. 1, Jan. 1991, pp. 1-13.

Boissonnat et al., "Smooth Surface Reconstruction via Natural Neighbour Interpolation of Distance Functions", Computational Geometry, vol. 22, 2002, pp. 185-203.

Bremer et al., "A Sampling Theorem for MLS Surfaces", Eurographics Symposium on Point-Based Graphics, 2005, pp. 47-54.

Cazals et al., "Delaunay Triangulation Based Surface Reconstruction", Effective Computational Geometry for Curves and Surfaces, 2006, pp. 231-276.

Chang et al., "Surface Reconstruction from Point Clouds by Transforming the Medial Scaffold", Computer Vision and Image Understanding, vol. 113, No. 11, pp. 1-16. 2009.

Dey, "Curve and Surface Reconstruction: Algorithms with Mathematical Analysis", Cambridge University Press, 2007, 2 pages.

Fleishman et al., "Robust Moving Least-Squares Fitting with Sharp Features", ACM, 2005, pp. 544-552.

Guennebaud et al., "Algebraic Point Set Surfaces", ACM Transactions on Graphics, vol. 26, No. 3, Article 23, Jul. 2007, pp. 23-1-23-9.

Hoppe et al., "Surface Reconstruction from Unorganized Points", Computer Graphics, vol. 26, No. 2, Jul. 26-31, 1992, pp. 71-78.

Kazhdan et al., "Reconstruction of Solid Models from Oriented Point Sets", Eurographics Symposium on Geometry Processing, The Eurographics Association, 2005, 11 pages.

Kazhdan et al., "Poisson Surface Reconstruction", Eurographics Symposium on Geometry processing, Eurographics Association, 2006, 10 pages.

Kazhdan et al., "Unconstrained Isosurface Extraction on Arbitrary Octrees", Eurographics Symposium on Geometry Processing, The Eurographics Association, 207, 9 pages. 2007.

Kobbelt et al., "A Survey of Point-Based Techniques in Computer Graphics", Computers & Graphics, vol. 28, 2004, pp. 801-814.

Lorensen et al., "Marching Cubes: A High Resolution 3D Surface Construction Algorithm", Computer Graphics, vol. 21, No. 4, Jul. 1987, pp. 163-169.

Manson et al., "Streaming Surface Reconstruction Using Wavelets", Eurographics Symposium on Geometry Processing, vol. 27, No. 5, 2008, pp. 1411-1420.

Ohtake et al., "Multi-Level Partition of Unity Implicits", ACM SIGGRAPH, 2005, 8 pages.

Schaefer et al., "Dual Marching Cubes: Primal Contouring of Dual Grids", Computer Graphics Forum, vol. 24, No. 2, 2005, pp. 195-201.

\* cited by examiner

```
procedure estimateNCH () {
  for i = 1 to i = N step 1 do {
    ρ_i = 0
    for j = 1 to j = N step 1 do {
      if j = i continue
      a = n_i^t (p_j - p_i)
      b = ‖p_j - p_i‖^2
      if ( a - ρ_i b > 0 ) ρ_i = a/b
    }
  }
}
```

FIG. 2

| A method for reconstructing a surface of an object, said method comprising the steps of: |
|---|
| sampling a boundary surface of the object to obtain a data set, the data set comprises oriented points including sample point locations associated with orientation vectors; |
| estimating non-convex hull signed distance function parameters from the data set; |
| evaluating the non-convex hull signed distance function on vertices of a volumetric mesh; and |
| approximating the zero level set of the non-convex hull signed distance function by a polygonal mesh using an isosurface algorithm. |

FIG. 2A

| |
|---|
| Estimating non-convex hull distance function parameters from the data set comprising the following steps: |
| a. associating a set of curvature parameters with the oriented points; |
| b. selecting a first oriented point of the data set, the first oriented point including a first sample point location and a first orientation vector, the first oriented point having an associated first curvature parameter; |
| c. initializing the first curvature parameter to zero; |
| d. selecting a second oriented point of the data set, the second oriented point being different from the first oriented point, the second oriented point including a second sample point location and a second orientation vector; |
| e. computing a first displacement vector from the first sample point location to the second sample point location; |
| f. computing a first temporary parameter as the inner product of the first orientation vector and the first displacement vector; |
| g. computing a second temporary parameter as the square norm of the first displacement vector; |
| h. computing a third temporary parameter as the result of subtracting the product of the first curvature parameter times the second temporary parameter from the from temporary parameter; |
| i. if the third temporary parameter is larger than zero, making the first curvature parameter equal to the result of dividing the first temporary parameter by the second temporary parameter; |
| j. repeating the steps d. to i. until every second oriented point has been selected; |
| k. repeating steps b. to j. until every first oriented point has been selected. |

FIG. 3

```
procedure evaluateNCH(x)() {
    f_x = -∞
    for i = 1 to i = N step 1 do {
        a = n_i^t(x - p_i)
        b = ||x - p_i||^2
        c = a - ρ_i b
        if (c > f_x) f_x = c
    }
    return f_x
}
```

FIG. 4

| Evaluating the non-convex hull signed distance function on vertices of a volumetric mesh, the step of evaluating further comprises the steps of: |
|---|
| a. selecting a first vertex of the volumetric mesh; |
| b. setting a first vertex evaluation value to negative infinity; |
| c. selecting a third oriented point of the data set, the third oriented point including a third sample point location, and a third orientation vector; the third oriented point having an associated third curvature parameter from the set of curvature parameters; |
| d. computing a second displacement vector from the first vertex to the third sample point location; |
| e. computing a fourth temporary parameter as the inner product of the third orientation vector and the second displacement vector; |
| f. computing a fifth temporary parameter as the square norm of the second displacement vector; |
| g. computing a sixth temporary parameter as the result of subtracting the product of the third curvature parameter times the fifth temporary parameter, from the fourth temporary parameter; |
| h. if the sixth parameter is larger than the first vertex evaluation value, making the first vertex evaluation value equal to the sixth parameter; |
| i. repeating the steps c. to h. until every third oriented point has been selected; |
| j. repeating steps a. to i. until every first vertex of the volumetric mesh has been selected. |

FIG. 5

```
procedure estimateSymmetricNCH () {
  for i = 1 to i = N step 1 do {
    ρ_i^+ = ρ_i^- = 0
    for j = 1 to j = N step 1 do {
      if j == i continue
      a = n_i^t (p_j - p_i)
      b = ||p_j - p_i||^2
      if (a - ρ_i^+ b > 0) ρ_i^+ = a/b
      c = -a
      if (c - ρ_i^- b > 0) ρ_i^- = c/b
    }
  }
}
```

FIG. 7

NON-CONVEX HULL SURFACES

CROSS REFERENCE TO RELATED APPLICATION

This non-provisional patent application is related to and claims priority from earlier filed U.S. Provisional Patent Appl. No. 61/896,300 filed Oct. 28, 2013, incorporated by reference herein.

BACKGROUND OF THE INVENTION

The invention is a computer implemented method, device, system, or article for reconstructing a surface of an object. In particular, the invention comprises estimating a non-convex hull signed distance function parameters from a data set of an object and evaluating the non-convex hull signed distance function on vertices of a volumetric mesh. The invention further comprises approximating the zero level set of the non-convex hull signed distance function by a polygonal mesh using an isosurface algorithm to provide surface reconstruction of an object.

Oriented point clouds are usually obtained using optical measuring devices such as laser scanners and structured lighting systems, or by other computational means such as multi-view stereo reconstruction and other simulation algorithms. Dense colored oriented point clouds have become a pervasive surface representation in computer graphics.

The prior art on surface reconstruction from point clouds is extensive, spanning more than two decades. But despite its long history, the area is still very active. One family of algorithms produces interpolating polygon meshes where all or some of the input points become vertices of the polygons. Many of these algorithms are combinatorial in nature, and come with differing reconstruction quality.

To compensate for measurement errors, various representations for the reconstructed surface have been considered. Since the implicit representation provides watertight surfaces, most surface reconstruction methods in this category produce implicit surfaces. Prior art examples include reconstructing a binary indicator function and fitting and blending, or moving least squares based on local function. Most of these methods have issues in solving large scale numerical optimization problems.

Even though the implicit functions produced by some of these approximating methods have explicit analytic forms, since polygon meshes are usually needed for visualization or further computation purposes, the implicit function is often evaluated on a regular grid of sufficient resolution. However, the cost of evaluating the implicit function on a regular grid is often excessive.

Notwithstanding the prior art, it would therefore be desirable to provide a more efficient and optimized method, device, or article for reconstructing a surface of an object.

BRIEF SUMMARY OF THE INVENTION

In one embodiment, the invention is a computer implemented method for reconstructing a surface of an object. In one embodiment, the surface is a smooth oriented, watertight surface. In particular, the invention provides sampling a boundary surface of the object to obtain a data set. The data set may be a finite set or, alternatively, an infinite set. The data set comprises oriented points including sample point locations associated with orientation vectors. The associated orientation vectors are consistently oriented either towards the outside or towards the inside of the object. In one embodiment, the geometry of the reconstructed surface is independent of a reversal of the orientation vector.

By way of example, without limitation, the data set is acquired using optical measuring devices having one or more sensors. In another embodiment, the data set is acquired using multi-view stereo reconstruction having one or more sensors. In one embodiment, the orientation vectors are computed by independent measurements provided by the sensor. Also, the orientation vectors can be computed using neighboring sample point locations. Further, the orientation vectors can be computed using neighboring sample point locations and locations of the sensors.

In one embodiment, the data set is obtained using an adaptive subsampling method by interpolating a subset of the oriented points and approximating the remaining oriented points under defined maximum error.

The next step comprises estimating a non-convex hull signed distance function parameters from the data set. The step of estimating further comprises one or more of the following steps. First step, a set of curvature parameters is associated with the oriented points. Second step, a first oriented point is selected from the data set. The first orientated point includes a first sample point location and a first orientation vector. The first oriented point has an associated first curvature parameter. Third step, the first curvature parameter is initialized to zero. Fourth step, a second oriented point of the data set is selected. The second oriented point is different from the first oriented point. The second orientated point includes a second sample point location and a second orientation vector. Fifth step, a first displacement vector is computed from the first sample point location to the second sample point location. Sixth step, a first temporary parameter is computed as the inner product of the first orientation vector and the first displacement vector. Seventh step, a second temporary parameter is computed as the square norm of the first displacement vector. Eighth step, a third temporary parameter is computed as the result of subtracting the product of the first curvature parameter times the second temporary parameter from the first temporary parameter. Ninth step, if the third temporary parameter is larger than zero, the first curvature parameter is made equal to the result of dividing the first temporary parameter by the second temporary parameter. Tenth Step, steps four to nine are repeated until every second oriented point has been selected. Steps two to ten are repeated until every first oriented point has been selected.

The invention further provides evaluating the non-convex hull signed distance function on vertices of a volumetric mesh. The step of evaluating further comprises one or more of the following steps. First step, a first vertex is selected of the volumetric mesh. Second step, a first vertex evaluation value is set to negative infinity. Third step, a third oriented point of the data set is selected. The third orientated point includes a third sample point location, and a third orientation vector. The third oriented point has an associated third curvature parameter from the set of curvature parameters. Fourth step, a second displacement vector is computed from the first vertex to the third sample point location. Fifth step, a fourth temporary parameter is computed as the inner product of the third orientation vector and the second displacement vector. Sixth step, a fifth temporary parameter is computed as the square norm of the second displacement vector. Seventh step, a sixth temporary parameter is computed as the result of subtracting the product of the third curvature parameter times the fifth temporary parameter from the fourth temporary parameter. Eighth step, if the sixth parameter is larger than the first vertex evaluation value then make the first vertex evaluation value equal to the sixth parameter. Ninth step, steps three to eight are repeated until every third oriented point has been selected. Tenth step, Steps one to nine are repeated until every first vertex of the volumetric mesh has been selected. By way of example, without limitation, the volumetric mesh is a regular volumetric mesh. In another embodiment, the volumetric mesh is an adaptive volumetric mesh. In a further embodiment, the volumetric mesh is a regular voxel grid. In an additional embodiment, the volumetric mesh is an octree.

The next step comprises approximating the zero level set of the non-convex hull signed distance function by a polygonal mesh using an isosurface algorithm to provide surface reconstruction of an object. By way of example, without limitation, the isosurface algorithm used is Marching Cubes Algorithm. In another embodiment, the isosurface algorithm used is Dual Marching Cubes Algorithm.

In another embodiment, the invention is a device for reconstructing a surface of an object. By way of example, without limitation, the device is a program storage device readable by machine, tangibly embodying a program of instructions executable by the machine to perform the method steps above for reconstructing a surface of an object.

In another embodiment, the invention is an article of manufacture for reconstructing a surface of an object. By way of example, without limitation, the article is a computer readable medium having computer readable program code means embodied thereon. The computer readable program code means comprising the method steps above for reconstructing a surface of an object.

BRIEF DESCRIPTION OF THE DRAWINGS

The novel features which are characteristic of the invention are set forth in the appended claims. However, the computer implemented method, device, system, and article of the invention together with further embodiments and attendant advantages, will be best understood by reference to the following detailed description taken in connection with the accompanying drawings in which:

FIG. 2 shows a procedure to estimate the NCH Signed Distance function parameters $\rho_1, \ldots, \rho_N$ for a finite set of oriented points $p_1, \ldots, p_N$ with associated unit length orientation vectors $n_1, \ldots, n_N$;

FIG. 2A is a flow diagram.

FIG. 3 is a block diagram of the procedure for estimating of FIG. 2;

FIG. 4 is a procedure to evaluate the NCH Signed Distance function at a 3D point x;

FIG. 5 is a block diagram of the procedure for evaluating of FIG. 4;

FIG. 7 is a procedure to estimate the symmetric NCH Signed Distance function parameters $\rho_1^+, \ldots, \rho_N^+$ and $\rho_1^-, \ldots, \rho_N^-$;

DETAILED DESCRIPTION OF THE PREFERRED EMBODIMENTS

Referring generally to FIGS. 1-15, the invention is a computer implemented method, device, system, or article for reconstructing a surface of an object. In particular, the invention comprises estimating a non-convex hull signed distance function parameters from a data set of an object and evaluating the non-convex hull signed distance function on vertices of a volumetric mesh. The invention further comprises approximating the zero level set of the non-convex hull signed distance function by a polygonal mesh using an isosurface algorithm to provide surface reconstruction of an object.

Figure 1:
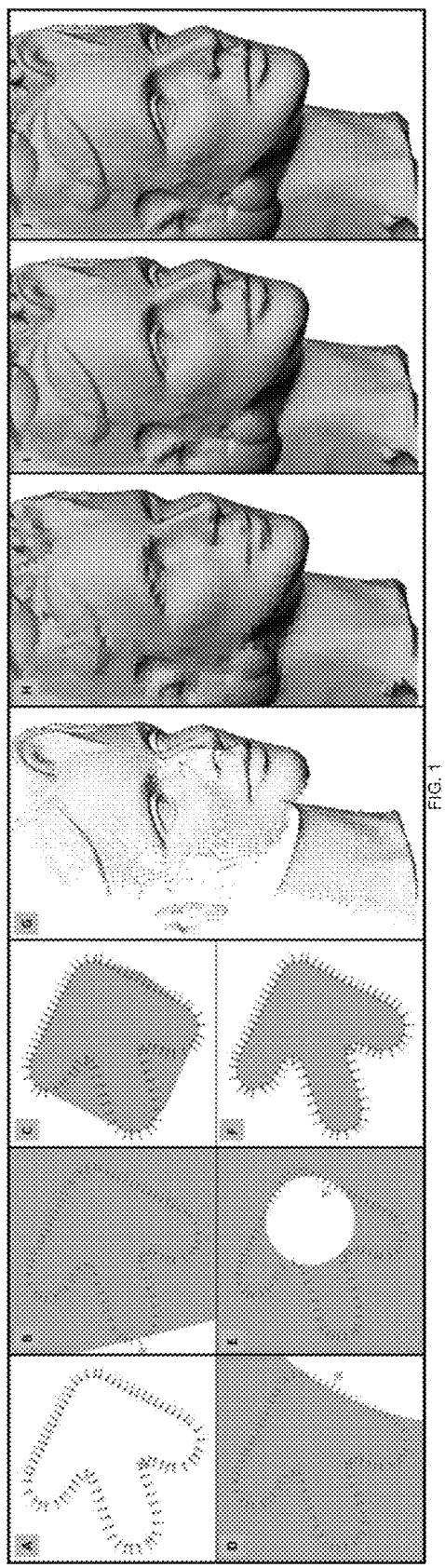
FIG. 1 is a series of images showing the method for reconstructing a surface of an object.

Referring to FIG. 1, the results of the method for reconstructing a surface of the object are illustrated, herein explained further: A: A 2D oriented point cloud; B: A supporting linear half space for one of the oriented points; C: The oriented convex hull (OCH) of the point cloud; D: An outside supporting circle for one of the points; E: Inside supporting circles are obtained by inverting the orientation vectors; and F: The non-convex hull (NCH) of the oriented point cloud is the intersection of the complement of all the outside supporting circles; and G: A 3D oriented point cloud. NCH surface reconstructions based on octrees of depth 7 (H), 8 (I), and 9 (J).

Still referring to FIG. 1, the invention provides an algorithm to reconstruct an approximating watertight surface from a finite oriented point cloud sampled from the smooth boundary surface of a solid object. The Convex Hull (CH) of an arbitrary set of points is the intersection of all the supporting linear half spaces. The CH boundary surface is piecewise linear and watertight, but since it cannot represent concavities; it is usually a poor approximation of the sampled surface. The invention provides the Non-Convex Hull (NCH) of an oriented point cloud as the intersection of complementary spherical half spaces; one per point. The boundary surface of this set is a piecewise quadratic interpolating surface, which can also be described as the zero level set of the NCH Signed Distance function. Instead of developing a combinatorial algorithm to reconstruct this Non Convex Hull Surface as a union of quadratic and linear patches, the NCH Signed Distance function is evaluated on the vertices of a volumetric mesh, regular or adaptive, and generates an approximating polygonal mesh for the NCH Surface using an isosurface algorithm. Despite its simplicity, this naïve algorithm produces high quality polygon meshes competitive with those generated by state-of-the-art algorithms. It is able to deal with moderate irregular sampling, and it is massively parallelizable. Since interpolating surfaces are not always desirable, we also propose an octree-based sampling scheme to construct a bounded-error approximating NCH Signed Distance function, which significantly speed-up the computation, but can produce meshes of the same quality.

In one embodiment, the invention is a computer implemented method for reconstructing a surface of an object. In one embodiment, the surface is a smooth oriented, watertight surface. In particular, the invention provides sampling a boundary surface of the object to obtain a data set. The data set may be a finite set or, alternatively, an infinite set. The data set comprises oriented points including sample point locations associated with orientation vectors. The associated orientation vectors are consistently oriented either towards the outside or towards the inside of the object. In one embodiment, the geometry of the reconstructed surface is independent of a reversal of the orientation vector.

In one embodiment, the invention provides reconstructing an oriented watertight surface approximating a finite set of oriented points $\mathcal{P} = \{p_1, \ldots, p_N\}$, regarded as the result of sampling the boundary surface S of a bounded solid object O. Furthermore, it is assumed that the surface S is smooth oriented closed surface with bounded curvature embedded in 3D space. In particular, each sample point pi has an associated unit length orientation vector $n_i$ equal to the normal vector to the surface S at the sample point $p_i$, and all these vectors are consistently oriented, either towards the outside, or towards the inside of the object. To develop the mathematical foundations of the proposed methods we also consider the continuous case, where the set of oriented points is infinite and equal to the whole surface S.

A continuous and piecewise quadratic NCH Signed Distance function is constructed as a function of the oriented point locations and orientation vectors. This function interpolates the point locations and its gradient interpolates the orientation vectors. The NCH Signed Distance is obtained in analytic form as the result of a simple and direct arithmetic computation, which no optimization. Neither large scale iterative numerical method is neither required, nor solving large and sparse linear systems. Rather than solving the combinatorial problem of constructing the zero level set of the NCH Signed Distance function explicitly as a polygon mesh with curved edges and faces, it is evaluated on the vertices of a volumetric mesh, such as a regular voxel grid, or an octree constructed as a function of the point locations, and remaining points under user-specified maximum error.

The invention provides a number of benefits including: 1) the Non-Convex Hull of an oriented point cloud (finite or infinite), and show that it can be described as a half space of the NCH Signed Distance function; 2) establish the relation with the Medial Axis Transform and related surface reconstruction algorithms; 3) show that a naïve algorithm based on evaluating the NCH Signed Distance on the vertices of a regular voxel grid produces high quality watertight polygon meshes; 4) propose the NCS Surfaces as a new surface representation; and 5) describe an octree-based subsampling scheme which significantly reduces the computation cost, while guaranteeing that the generated surfaces approximate all the input points under maximum error constraints.

By way of example, without limitation, the data set is acquired using optical measuring devices having one or more sensors. In another embodiment, the data set is acquired using multi-view stereo reconstruction having one or more sensors. In one embodiment, the orientation vectors are computed by independent measurements provided by the sensor. Also, the orientation vectors can be computed using neighboring sample point locations. Further, the orientation vectors can be computed using neighboring sample point locations and locations of the sensors.

In one embodiment, the data set is obtained using an adaptive subsampling method by interpolating a subset of the oriented points and approximating the remaining oriented points under defined maximum error.

To emphasize the simplicity of the proposed methods, we start by describing what we call the Naïve NCH Surface Reconstruction algorithm. In subsequent sections, a mathematical framework is provided to explain why this algorithm works, and how it is related to other surface reconstruction algorithms. The Naïve NCH Surface Reconstruction algorithm for a finite set of oriented points comprises three steps: 1) estimating the NCH Signed Distance function parameters; 2) evaluating the NCH Signed Distance function on the vertices of a volumetric mesh such as a regular voxel grid or an octree; 3) approximating the zero level set of the NCH Signed Distance function by a polygon mesh using an isosurface algorithm.

For a fine set of points $\{p_1, \ldots, p_N\}$ with associated unit length orientation vectors $\{n_1, \ldots, n_N\}$ we define the value of the NCH Signed Distance function at a 3D point x as the maximum over N basis functions, $$f(x) = \max_{1 \leq i \leq N} f_i(x) \tag{1}$$

where for each oriented point $(p_i, n_i)$, we have one basis function $$f_i(x) = n_i^t(x - p_i) - \rho_i \|x - p_i\|^2 \tag{2}$$

and the parameter $\rho_i \geq 0$ is determined as $$\rho_i = \min\left\{\frac{n_i^t(p_j - p_i)}{\|p_j - p_i\|^2} : j \in J_i\right\} > 0 \tag{3}$$

if the set $J_i$ of indices $j=1, \ldots, N$ such that $n_i^t(p_j - p_i) > 0$ is empty, and $\rho_i = 0$ otherwise.

Referring to FIGS. 2-3, the next step comprises estimating a non-convex hull signed distance function parameters from the data set. FIG. 2 shows a procedure or pseudocode for this process to estimate the NCH Signed Distance function parameters $\rho_1, \ldots, \rho_N$ for a finite set of oriented points $p_1, \ldots, p_N$ with associated unit length orientation vectors $n_1, \ldots, n_N$.

FIG. 2A is a flow diagram of an exemplary method for reconstructing a surface of an object.

FIG. 3 is a block diagram of the procedure for estimating of FIG. 2. Referring to FIG. 3, the step of estimating further comprises one or more of the following steps. First step, a set of curvature parameters is associated with the oriented points. Second step, a first oriented point is selected from the data set. The first orientated point includes a first sample point location and a first orientation vector. The first oriented point has an associated first curvature parameter. Third step, the first curvature parameter is initialized to zero. Fourth step, a second oriented point of the data set is selected. The second oriented point is different from the first oriented point. The second orientated point includes a second sample point location and a second orientation vector. Fifth step, a first displacement vector is computed from the first sample point location to the second sample point location. Sixth step, a first temporary parameter is computed as the inner product of the first orientation vector and the first displacement vector. Seventh step, a second temporary parameter is computed as the square norm of the first displacement vector. Eighth step, a third temporary parameter is computed as the result of subtracting the product of the first curvature parameter times the second temporary parameter from the first temporary parameter. Ninth step, if the third temporary parameter is larger than zero, the first curvature parameter is made equal to the result of dividing the first temporary parameter by the second temporary parameter. Tenth Step, steps four to nine are repeated until every second oriented point has been selected. Steps two to ten are repeated until every first oriented point has been selected.

Referring to FIGS. 4-5, the invention further provides evaluating the non-convex hull signed distance function on vertices of a volumetric mesh. FIG. 4 is a pseudocode for the procedure to evaluate the NCH Signed Distance function at a 3D point x. If the NCH Signed Distance is evaluated at all the vertices of a regular voxel grid is used, an isosurface algorithm such as Marching Cubes can be used to generate a polygon mesh approximating the zero level set of the NCS Signed Distance function, completing the surface reconstruction algorithm.

FIG. 5 is a block diagram of the procedure for evaluating of FIG. 4. The step of evaluating further comprises one or more of the following steps. First step, a first vertex is selected of the volumetric mesh. Second step, a first vertex evaluation value is set to negative infinity. Third step, a third oriented point of the data set is selected. The third orientated point includes a third sample point location, and a third orientation vector. The third oriented point has an associated third curvature parameter from the set of curvature parameters. Fourth step, a second displacement vector is computed from the first vertex to the third sample point location. Fifth step, a fourth temporary parameter is computed as the inner product of the third orientation vector and the second displacement vector. Sixth step, a fifth temporary parameter is computed as the square norm of the second displacement vector. Seventh step, a sixth temporary parameter is computed as the result of subtracting the product of the third curvature parameter times the fifth temporary parameter from the fourth temporary parameter. Eighth step, if the sixth parameter is larger than the first vertex evaluation value then make the first vertex evaluation value equal to the sixth parameter. Ninth step, steps three to eight are repeated until every third oriented point has been selected. Tenth step, Steps one to nine are repeated until every first vertex of the volumetric mesh has been selected. By way of example, without limitation, the volumetric mesh is a regular volumetric mesh. In another embodiment, the volumetric mesh is an adaptive volumetric mesh. In a further embodiment, the volumetric mesh is a regular voxel grid. In an additional embodiment, the volumetric mesh is an octree.

The next step comprises approximating the zero level set of the non-convex hull signed distance function by a polygonal mesh using an isosurface algorithm to provide surface reconstruction of an object. By way of example, without limitation, the isosurface algorithm used is Marching Cubes Algorithm. In another embodiment, the isosurface algorithm used is Dual Marching Cubes Algorithm.

Figure 6:
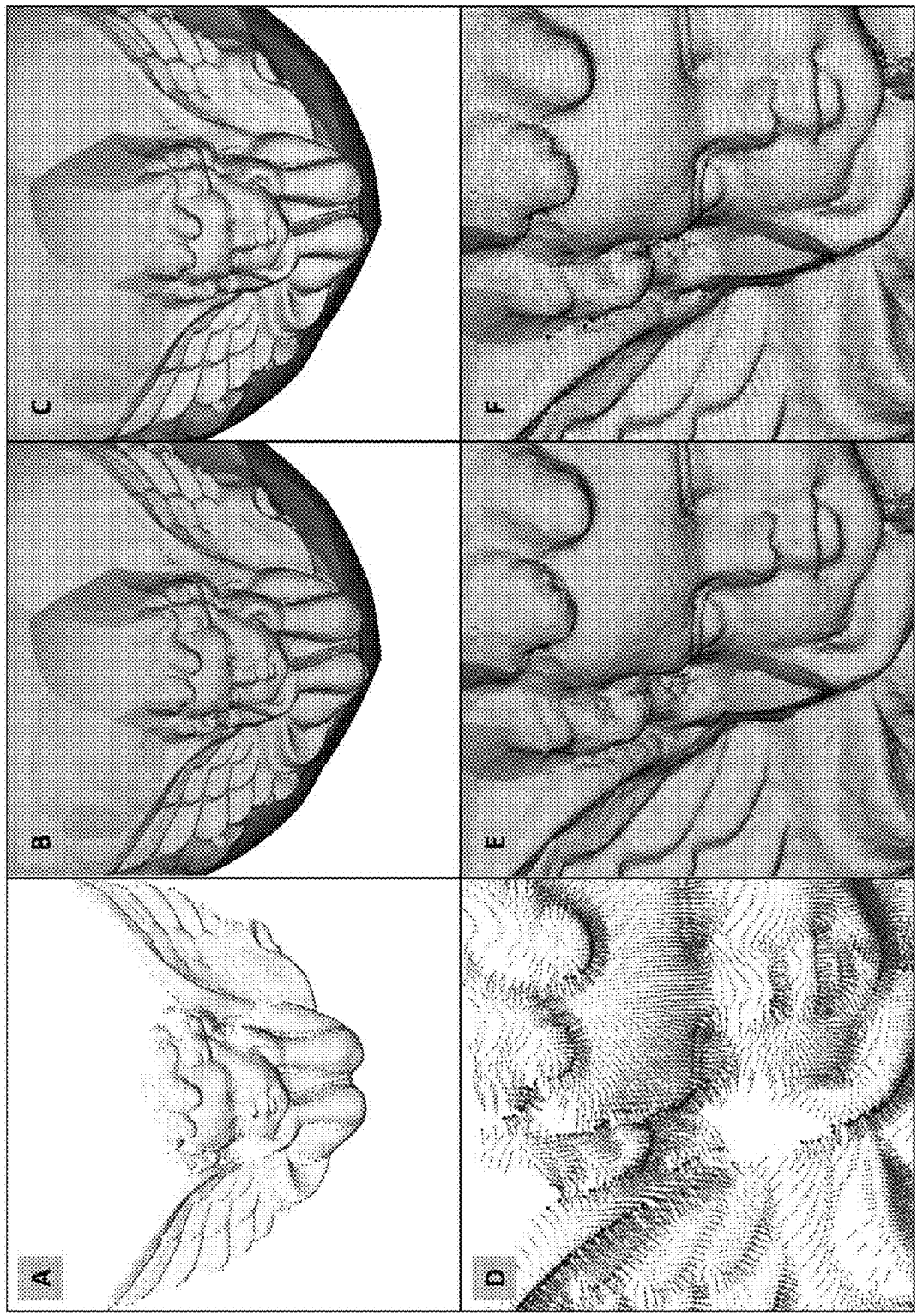
FIG. 6 is a series of images showing the results of the method for reconstructing a surface of an object.

Referring to FIG. 6, one result is obtained with the naïve algorithm. This oriented point cloud has about 25K points, and constitutes a partial irregular scan of the angel figure from one point of view. A bounding box with equal sides was first computed and used to generate a regular 500×500×500 voxel grid. To avoid missing important details in the reconstruction, a regular voxel grid of sufficiently high resolution, for instance such that different points fall in different voxels, must be chosen.

Still referring to FIG. 6, the results of the method for reconstructing a surface of the object are illustrated, herein explained further: A: An oriented point cloud with approximately 25K points; B: The polygon mesh extracted by the naïve algorithm on $500^3$ voxel grid; C: The oriented points superimposed with the mesh; D: detail view of the point cloud showing points and orientation vectors; E: close-up view of B; and close-up view of C. Note that the polygon density is higher than the point cloud sampling rate. The reconstructed polygon mesh has 556,668 vertices and 555,386 faces.

Even though large areas of missing data points and holes are filled because the output mesh is watertight (except for its intersection with boundaries of the bounding box), the algorithm not always fills holes in an intuitive manner, as can be observed in the figures. Some of the surface reconstruction algorithms are based on variational principles which tend to fill holes in a more intuitive and predictable fashion. However, since it is not iterative, the algorithm is robust, and in many cases it can deal gracefully with uneven sampling.

For simplicity, let's assume that the regular voxel grid has the same number of samples M equally spaced in each dimension. The NCH signed distance function f(x) must be evaluated $M^D$ times, where D is the dimension of the ambient space. The evaluation of f(x) at an arbitrary point x has computational complexity O(N) and storage complexity O(1). Overall, this algorithm has computational complexity $O(N\ M^D)$, and storage complexity $O(M^D)$ for an in-core isosurface algorithm such as Marching Cubes. The memory footprint can be reduced to $O(M^{D-1})$ by using an out-of-core implementation of Marching Cubes, which requires in-core access to only two contiguous voxel planes of scalar function values. But this change does not reduce the computational complexity resulting from evaluating the NCH Signed Distance function at the $M^D$ vertices of the voxel grid. Later on, we consider adaptive octree grids of different resolutions to reduce the number of function evaluations, along with the Dual Marching Cubes isosurface algorithm, and we present a sampling scheme to speed up the algorithm.

If the orientation vectors are reversed, a different Non-Convex Hull Signed Distance function results, and a different surface is reconstructed. Since it is common to encounter data sets with orientations reversed, it is important for a surface reconstruction algorithm to produce the same results independently of orientation reversals. Towards this goal, let $f^+(x)$ be the NCH Signed Distance function of equation (1) computed for the original point orientations, and $f^-(x)$ the same function computed for the reversed orientations $(n_i \mapsto -n_i)$. Explicitly, we compute the value of of $\rho_i^+$ as a function of the oriented point $(p_i, n_i)$, resulting in the signed distance functions $f^+(x)$, and the value of $\rho_i^-$ as a function of the oriented point $(p_i, -n_i)$, resulting in the signed distance functions $f^-(x)$.

We define the Symmetric NCH Signed Distance function as $$f(x) = \frac{1}{2}\{f^+(x) - f^-(x)\}. \tag{4}$$

When the orientation vectors are reversed, the two functions $f^+(x)$ and $f^-(x)$ are interchanged, and the function f(x)

changes sign, but its zero level set remains the same. As a result, except for the surface orientation, the geometry of the reconstructed surface is independent of the global orientation.

Referring to FIG. 7, a procedure or pseudocode is provided to estimate the symmetric NCH Signed Distance function parameters $\rho_1^+, \ldots, \rho_N^+$ and $p_1^-, \ldots, \rho_N^-$. FIG. 7 shows how to modify the procedure shown in FIG. 2 to estimate the $\rho_1^+, \ldots, \rho_N^+$ and $p_1^+, \ldots, p_N^+$ simultaneously.

Still referring to FIG. 7, the procedure or pseudocode for estimating the symmetric NCH Signed Distance function parameters comprises one or more of the following steps. First step, a set of positive curvature parameters and a set of negative curvature parameters is associated with the oriented points. Second step, a first oriented point of the data set is selected. The first orientated point includes a first sample point location and a first orientation vector. The first oriented point has an associated first positive curvature parameter and an associated first negative curvature parameter. Third step, the first positive curvature parameter and the first negative curvature parameter are initialized to zero. Fourth step, a second oriented point of the data set is selected. The second oriented point is different from the first oriented point. The second orientated point includes a second sample point location and a second orientation vector. Fifth step, a first displacement vector is computed from the first sample point location to the second sample point location. Sixth step, a first temporary parameter is computed as the inner product of the first orientation vector and the first displacement vector. Seventh step, a second temporary parameter is computed as the square norm of the first displacement vector. A third temporary parameter is computed as the result of subtracting the product of the first positive curvature parameter times the second temporary parameter from the first temporary parameter. Eight step, if the third temporary parameter is larger than zero, the first positive curvature parameter is made equal to the result of dividing the first temporary parameter by the second temporary parameter. Ninth step, a fourth temporary parameter as the negative of the first temporary parameter is computed. Tenth step, a fifth temporary parameter is computed as the result of subtracting the product of the first negative curvature parameter times the second temporary parameter from the third temporary parameter. Eleventh step, if the fifth temporary parameter is larger than zero, the first negative curvature parameter is made equal to the result of dividing the third temporary parameter by the second temporary parameter. Twelfth step, steps four to twelve above are repeated until every second oriented point has been selected. Thirteen step, steps two to twelve are repeated until every first oriented point has been selected.

Figure 8:
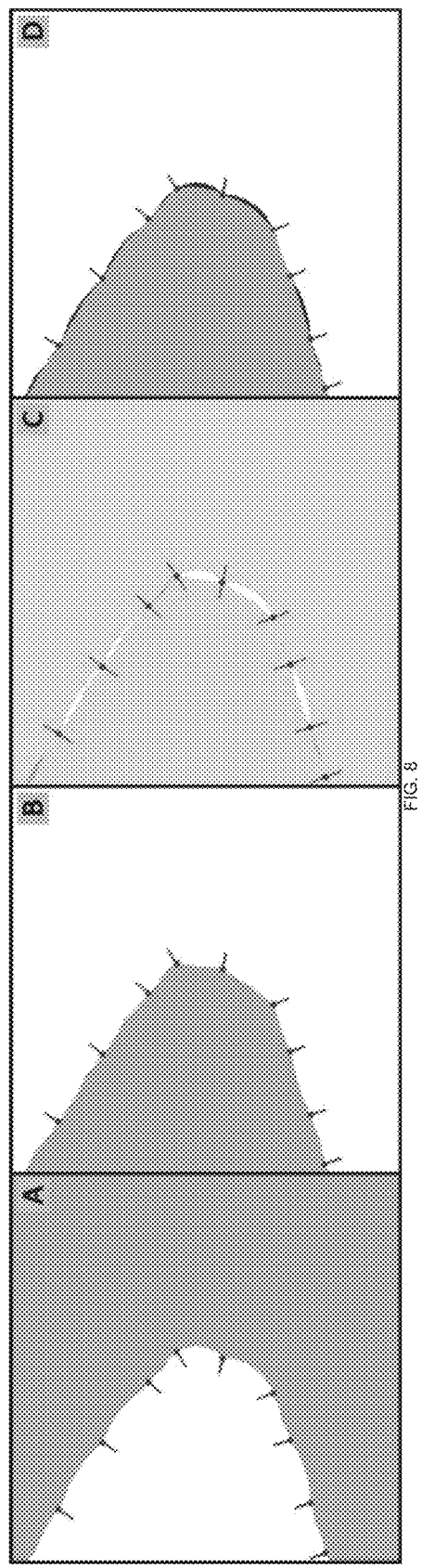
FIG. 8 is a view of the zero level sets of the NCH Signed Distance function computed from $f^+(x)$(A) and $f^-(x)$(B). A region between these two curves (C) which contains the points, as well as the zero level set of the Symmetric NCH Signed Distance Function $f(x)$(D)

FIG. 8 shows the difference between the NCH computed from $f^+(x)$, $f^-(x)$, and $f(x)$ for a finite set of points $\mathcal{P}$ in 2D. We can observe that the zero level set of f(x) seems to be "in between" the zero level sets of $f^+(x)$ and $f^-(x)$. As a result, the zero level set of f(x) is somehow smoother than either one of other two. This is similar phenomenon observed and analyzed for the Medial Axis Transform.

Still referring to FIG. 8, a view is provided of the zero level sets of the NCH Signed Distance function computed from $f^+(x)$(A) and $f^-(x)$(B). A region is provided between these two curves (C) which contains the points, as well as the zero level set of the Symmetric NCH Signed Distance Function $f(x)$(D).

Each function $f_i(x)$, as shown in equation (2), is defined by a point, a unit length vector, and a non-negative number, which can be arranged as a row vector $(p_i, n_i, \rho_i)$. An array of N such parameter vectors can be regarded as a new surface representation, whether the $\rho_i$ parameters have been computed as described above or not, since they define a NCH Signed Distance function f(x). In general, we refer to a NCH Surface as a surface defined as the set of zeros of such one of these functions described in equation (1). More generally, we consider an array of row vectors with two non-negative numbers $N=\{(p_i, n_i, \rho_i^+, p_i^-): i=1, \ldots, N\}$ as a surface representation. These parameters can be saved to files using existing file formats, such as the popular PLY format, as a set of oriented points with two additional scalar fields. Colors can be added as additional fields as well, and these point clouds can be visualized using existing tools such as MeshLab.

The construction of a polygon mesh approximation is an independent step, which involves evaluating the Symmetric NCH Signed Distance defined by these parameters at the vertices of a volumetric grid to construct an isosurface. Using adaptive grids, only a region of interest can be reconstructed at high resolution. If the region of interest is selected interactively to inspect an object starting from a coarse reconstruction, a new isosurface has to be computed each time, but the number of function evaluations is significantly reduced.

Now we proceed to develop the mathematical foundations to explain the behavior of the proposed NCH Surface Reconstruction algorithm. We do so in two different ways. We present it as a generalization of the Convex Hull algorithm, and in we explore the relation with the Medial Axis Transform.

We refer to a half space as a set of points satisfying an inequality constraint $$H=\{x: f(x) \leq 0\}$$

for a continuous real-valued function f(x) defined for every point x in a certain domain U contained in the ambient space (2D or 3D here). A linear half space is defined by a linear function f(x). Given a set of points $\mathcal{P}$, finite or infinite, and not necessarily oriented, the half space H defined above (with f(x) linear or non-linear) is said to be a supporting half space for $\mathcal{P}$ if the following two conditions are satisfied: 1) the set $\mathcal{P}$ is contained in H, i.e., $P \subset H$; and 2) there is at least one point P in $\mathcal{P}$ where the function attains the value zero f(p)=0. The Convex Hull of the set P, denoted here CH($\mathcal{P}$), can be defined as the intersection of all the supporting linear half spaces for $\mathcal{P}$. Since a linear half space is convex set, and convexity is preserved by intersection, CH($\mathcal{P}$) is also a convex set. In fact, CH($\mathcal{P}$) is the smallest convex set which contains $\mathcal{P}$. Since the family of supporting linear half spaces can be infinite if the set $\mathcal{P}$ is infinite, for computational purposes CH($\mathcal{P}$) is usually approximated as the intersection of a finite number of supporting linear half spaces.

For a set $\mathcal{P}$ of oriented points, where each point p∈P has an associated unit length orientation vector $n_p$, again finite or infinite, we adopt a more restricted definition which takes into account the point orientations. Each oriented point p in the data set $\mathcal{P}$ defines a linear half space)

$$H_p = \{x : fp(x) \leq 0\} \quad (5)$$

where the linear function is $$f_p(x) = n_p^t(x-p). \quad (6)$$

One of these half spaces is the region painted gray in figure -B for the point p painted green. This linear function actually measures the signed distance to the boundary $\partial H_p = \{x : f_p(x) = 0\}$ of the half space $H_p$, the limit between the inside and the outside of $H_p$. The function $f_p(x)$ is a signed distance to $\partial H_p = \{x : f_p(x) = 0\}$ because it is negative inside $H_p$, positive outside, and has unit slope on $\partial H_p = \{x : f_p(x) = 0\} : \nabla f_p(x) = n_p$ and the orientation vector $n_p$ is unit length. Note, that the point p always belongs to the linear half space $H_p$ because $f_p(p) = n_p^t(p-p) = 0$, but $H_p$ may or may not be supporting for the whole set $\mathcal{P}$ regarded as a set of unoriented points. In order for $H_p$ to be supporting, it is necessary $0 \leq f_p^*(q) = n_p^t(q-p)$ for every other point $q \in \mathcal{P}$.

We define the Oriented Convex Hull of the oriented point cloud $\mathcal{P}$, denoted OCH($\mathcal{P}$) as the intersection of all the supporting linear half spaces $H_p$. Figure -C shows the OCH of the finite oriented point cloud of figure -A. Note that if the orientation of the points is reversed, we usually obtain a completely different result, since the family of supporting linear half spaces is different. In fact, other than for the trivial case of points sampled from a plane, the two families of half spaces have no common members. In particular, the family of supporting half spaces $H_p$ for the whole set of points may be empty, in which case OCH($\mathcal{P}$) is equal to the whole ambient space. Actually this is the case for the oriented point cloud of figure -A with the orientation vectors reversed. The Oriented Convex Hull of an oriented point set is still a convex set, and as such, its boundary does not usually constitute a faithful reconstruction of the surface sampled by the points, as shown in figure -C.

To be able to approximate the boundary surface of an object with concavities we augment the family of supporting half spaces. We need to allow non-convex half spaces, so that their intersection can represent solid objects with concavities. For each point p in the data set $\mathcal{P}$, with associated orientation vector $n_p$, and every positive value of r>0, we consider the function $$f_p^r(x) = \frac{1}{2r} \{r^2 - \|x - (p + rn_p)\|^2\} \quad (7)$$

defined for x in the domain U. This function is positive inside a sphere of radius r centered at the point $q = p + r n_p$, negative outside, attains its maximum value r/2 at the center point, and has unit slope at every point x where it is equal to zero, i.e. if $f_p^r(x) = 0$ then $\|\nabla f_p^r(x)\| = 1$.

Figure 9:
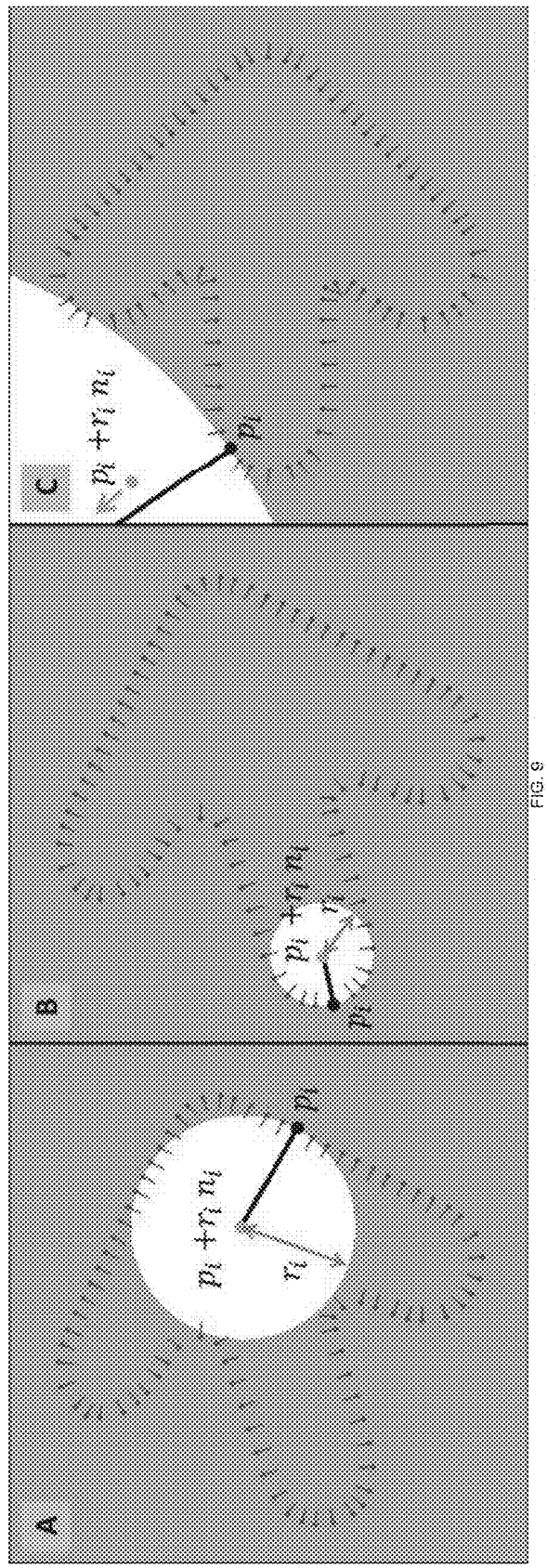
FIG. 9 is a view of the geometry of the spherical support functions $f_p(x)$.

Referring to FIG. 9, a view of the geometry of the spherical support functions $f_p(x)$ is provided. As shown in FIG. 9, the point $q = p + r n_p$ is located on the ray defined by the point p and vector $n_p$ at distance r from p. In addition, $f_p^r(p) = 0$, and $\nabla f_p^r(p) = n_p$ for all values or r. We define $r_p$ as the largest value of r so that $f_p^r(p') \leq 0$ for every other point $p' \in \mathcal{P}$. Both for finite sets of oriented points, and for smooth boundary surfaces of solid objects we have $r_p > 0$ for each data point $p \in \mathcal{P}$. As a result, the half space $$H_p = \{x : f_p(x) \leq 0\}$$

defined by the function.

$$f_p(x) = f_p^{r_p}(x) = n_p^t(x-p) - \rho_p \|x-p\|^2 \quad (8)$$

is supporting, where $\rho_p = 1/(2r_p) > 0$. We will refer to these sets $H_p$ as complementary spherical supporting half spaces. For the linear supporting half spaces to be included as special cases, we need to allow here $\rho_p = 0$, i.e. $r_p = \infty$. Figure -D shows an example of this construction. Also note that every oriented point p in the data set has an associated supporting half space $H_p$, and if the orientations are reversed ($n_p \mapsto -n_p$), completely different half spaces are obtained. This is illustrated in figure -E for the same point as in figure -D.

The value of $\rho_p$ for an oriented point p is computed as the minimum over all the positive values $$\rho_{pp'} = \frac{n_p^t(p'-p)}{\|p'-p\|^2} \quad (9)$$

over all other points $p' \neq p$ in the data set. If $\rho_{pp'} \leq 0$ for all the points p', then we set $\rho_p = 0$, because in this case the linear half space $H_p$ is supporting for the set $\mathcal{P}$.

We define the Non-Convex Hull of the oriented point set $\mathcal{P}$ denoted NCH($\mathcal{P}$), as the intersection of all the complementary spherical supporting half spaces $H_p$, as defined above. This is the same as saying that the complement of NCH($\mathcal{P}$) is a union of balls. Note that NCH($\mathcal{P}$) is also a half space. Namely, the half space defined by the continuous signed distance function $$f(x) = \sup_{p \in P} f_p(x) \quad (10)$$

where $f_p(x)$ are the functions of equation (8). This function is well defined when the data set is $\mathcal{P}$ bounded, and in particular when the data set is finite, where it reduces to the definition of section 2. Figure -F shows the Non-Convex Hull of the finite oriented point cloud shown in figure -A. The background images in figure has been computed by evaluating the signed distance on a pixel grid and thresholding the values.

As mentioned above, if the orientation vectors are reversed, a different signed distance function results, and a different Non-Convex Hull set is produced. As a result, the surfaces reconstructed in both cases may not be identical. We denote $f^+(x)$ the NCH Signed Distance function of equation (10) computed for the orientation vectors pointing towards the outside, and $f^-(x)$ the same function computed for the orientation vectors pointing towards the inside. The corresponding half spaces will be denoted NCH$^+(\mathcal{P})$ and NCH$^-(\mathcal{P})$ respectively.

In this section we assume that the set of points $\mathcal{P}$ is the continuous boundary surface S of a bounded solid object O, and that the object O, is an open set in 3D. Being the boundary of a bounded solid object in 3D, the surface S is bounded, orientable (separates the inside from the outside of O), closed, and it has no boundary (i.e., no holes). Furthermore we assume that the surface S is smooth, with a continuous unit length normal field pointing towards the inside of O, and continuous curvatures.

The Medial Axis Transform (MAT) is a representation of the object O as a union of balls. A ball $B=B(q,r)=\{x:\|x-q\|<r\}$ is an open sphere with a center q and a radius $r>0$. Being an open set, the solid object O is equal to the union of all the balls B contained in O. But this representation is too redundant to be used in a practical surface reconstruction algorithm. Since the set of all balls contained in O is partially ordered by inclusion, the Medial Axis Transform of O can be defined as the family MAT(O) of balls B contained in O which are maximal with respect to inclusion. The balls that belong to the MAT(O) are called medial balls. Obviously, the solid object O is also equal to the union of all the medial balls. To be more precise, we will refer to the Inside Medial Axis Transform, the Outside Medial Axis Transform, and the Symmetric Medial Axis Transform whenever necessary.

By definition, a medial ball B cannot be strictly contained in another ball B' contained in O. In particular, the boundary of every maximal ball intersect the surface S, because otherwise the given ball would be strictly contained in a ball with the same center and slightly larger radius, with the second ball also contained in O. In addition, at every point of contact the boundary of a maximal ball and the surface S are tangent, because otherwise the maximal ball would not be contained in O. The center of a medial ball is either a point with more than one closest point in S, or a center of curvature of S.

We define the Medial Axis of O, and we denote it MA(O), as the set of centers of medial balls. Since two different medial balls cannot have the same center, the mapping MA(O)→MAT(O) which assigns each medial ball center to the corresponding medial ball is well defined. The mapping is clearly 1-1 and onto. Another way of describing the Medial Axis Transform is as a set of points call the Medial Axis Set, or simply the Medial Axis, augmented with a non-negative radius function which assigns to each medial ball center the corresponding medial ball radius.

Herein, we present an alternative description of the Medial Axis Transform, where the medial balls are indexed not by centers, but by some boundary surface points. If B is a medial ball of center q and radius r, p is a point in the intersection of the boundary of B and S, and $n_p$ is the surface normal to S at p pointing towards the interior of O, since the boundary of B and S are tangent, the ball center q must lye on the normal ray defined by p and n, in which case we have $q=p+rn_p$. In addition, because of the maximality of the ball B, the radius r is uniquely determined: it must be equal to the maximum of radii $r'>0$ of balls centered at points $q'=p+r'n$ lying on the ray defined by the point p and the vector n, fully contained in O. On the other hand, if p is a point on the surface S, since O is the union of all the medial balls, and S is the boundary of this set, a medial ball B must exists so that p belongs to the intersection of the boundary of B and S.

In summary, every medial ball can be written as $B(p+r_p n_p, r_p)$ for at least one surface point p, where $$r_p = \max\{r'>0 : B(p+r'n_p, r') \subset O\}. \quad (11)$$

Note that in the mapping S→MAT(O) so defined, two or more surface points may map onto the same medial ball. But this is not a problem, and in fact it is an unusual event; what is important is that every medial ball is accounted for, so that the surface S can be reconstructed as the boundary of the union of balls $$O = \cup\{B(p+r_p n_p, r_p) : p \in S\}. \quad (12)$$

It follows that the surface S can be reconstructed as the boundary of the inside Non-Convex Hull $NCH^-(\mathcal{P})$ defined as a half space of the NCH Signed Distance $f^-(x)$. We denote $r_p^-(p)$ the inside radius function of equation (11).

If we perform the same construction for the balls contained in the outside of the object, and we regard linear half spaces as balls of infinite radii, then by a similar argument it follows that the surface S can also be reconstructed as the boundary of the outside Non-Convex Hull $NCH^+(\mathcal{P})$ defined as a half space of the outside NCH Signed Distance $f^+(x)$. We also denote $r_p^+(o)$ the outside radius function of equation (11).

The Local Feature Size at a surface point $p \in S$, denoted LFS(p) is usually defined as the distance from p to the nearest point in the Symmetrical Medial Axis [Amenta et al. 2001b; Dey 2007]. In our case, this value is equal to the minimum of $r_p^+$ and $r_p^-$. A finite set $\mathcal{P} \subset S$ is defined as an ∈-sample of S if the distance from any point $p \in S$ to its closest sample in $\mathcal{P}$ is at most ∈LFS(p). Several authors have shown that for sufficiently small ∈ the surface reconstructed as the boundary of MAT($\mathcal{P}$) is a geometrically accurate approximation of S [Amenta et al. 2001b; Dey 2007], and our experiments validate these theoretical results.

Since typically the NCH Signed Distance has constant sign in large regions, one way to potentially reduce the computational cost of the naïve algorithm, is to detect those areas and not to evaluate the function there.

Following a standard recursive space partition approach, we build an octree as a function of the point locations and the orientation vectors, independently of the NCH Signed Distance function. We compute a bounding box for the oriented points, and we set it as the root cell of the octree. At this point the dimensions of this hexahedral cell can be adjusted, for example to make it have equal side lengths, or to prevents points from being too close to the bounding box boundary. To perform the subdivision stop test we need to maintain a partition of the points into subsets contained in the cells. When cells are split, the subset of points associated with that cell has to be split as well. Starting with the root cell as the only member of the subdivision queue, while the queue is not empty we extract the first cell from the queue and perform the subdivision stop test on it. If the cell passes the test, it becomes a leaf of the octree. Otherwise we split the cell into eight children, and append them to the queue.

We use a local plane model to describes all the point locations and orientation vectors within a cell. The cell passes the subdivision stop test if all the points are within certain distance from the plane, and all the orientation vectors are within a certain angle from the plane normal vector. The linear function that we use for this test in our implementation is the one defined by the average location of the points within the cell, and the average orientation vector within the cell, normalized to unit length. Tolerances are specified for maximum deviations of point location from the plane defined by the linear function, and for the point orientation vectors from the plane normal vector. Empty cells are not split. Once the queue is empty the octree construction ends. In addition, the subdivision can be stopped when the number of cells exceeds a certain threshold, when number of points contained in the cell falls below another threshold, and/or by specifying a maximum octree depth.

When an isosurface algorithm such as Marching Cubes (MC) is applied to a scalar field defined on the primal vertices of an octree, a mesh with "cracks" typically results.

Instead, we evaluate the Symmetric NCH Signed Distance function at the centroids of the octree cells (dual octree vertices) after the octree construction process is completed, and then we nm the Dual Marching Cubes (MC) algorithm. The polygon meshes produced by DMC are adaptive, but have no cracks, because the dual of an octree is a conforming volumetric polyhedral mesh. All the adaptive results presented in this paper have been computed using our implementation of DMC.

Since the computational complexity is dominated by the number of points in the data set, a second way to reduce the computational cost is to reduce the number of points used to define the NCH Signed Distance function. Let S be a subset of the set of oriented points P. The NCH Signed Distance (positive, negative, or symmetric) $f_S(x)$ computed for the subset S is different from the NCH Signed Distance $f_P(x)$ computed for the full set P, and so are the two implicit surfaces defined by these functions, but $f_s(x)$ can be regarded as an approximation of $f_P(x)$. The question is how to measure the quality of this approximation, so that we can select a proper subset to satisfy user-specified tolerance.

While the zero level sets of both functions interpolate all the points in the subset S, only the zero level set of $f_p(x)$ interpolates all the data points. Since these functions have approximately unit slope near the data points, the value of the function approximates the signed distance to the corresponding zero level set. As a result, the maximum value of $|f_S(p_i)|$ over all the data points is a good estimate for the maximum distance from the points to the zero level set of $f_s(x)$, which we can use as a measure of how well the zero level set of $f_s(x)$, approximates the zero level set of $f_p(x)$. Given a user-specified maximum distance $\in > 0$, the problem is to select, amongst all the subsets of P, ideally the smallest subset which satisfies $|f_S(p_i)| < \in$ for all the data points. Rather than interpolating all the points, the resulting surface will approximate all the points, but with controlled tolerance. The parameter $\in$ is set by the user. In our implementation we specify it as a fraction of the longest side of the bounding box. Most of the results shown in the paper have been computed with $\in = 10^{-3}$ or $\in = 10^{-4}$. Specifying $\in = 0$ the octree subsampling scheme describe below is not executed, and the naïve algorithm is used instead, using all the points to compute the NCH Signed Distance function.

A simple hypothesize and test heuristic is provided: select an initial subset S, and test for maximum error; if necessary add some of the points with error above the threshold, and iterate until the maximum distance is satisfied by all the points. Since a new oriented point q which is very close to one already selected p have almost identical basis functions $f_p(x) \approx f_q(x)$, the order in which the new points are added may have a significant affect in the size S. In particular, it is not a good idea to add all the points which exceed the threshold, particularly if we start the process with a very small subset S. Points which are far away from points already selected should be considered first. To make the process somehow more efficient, we add points in batches.

Figure 10:
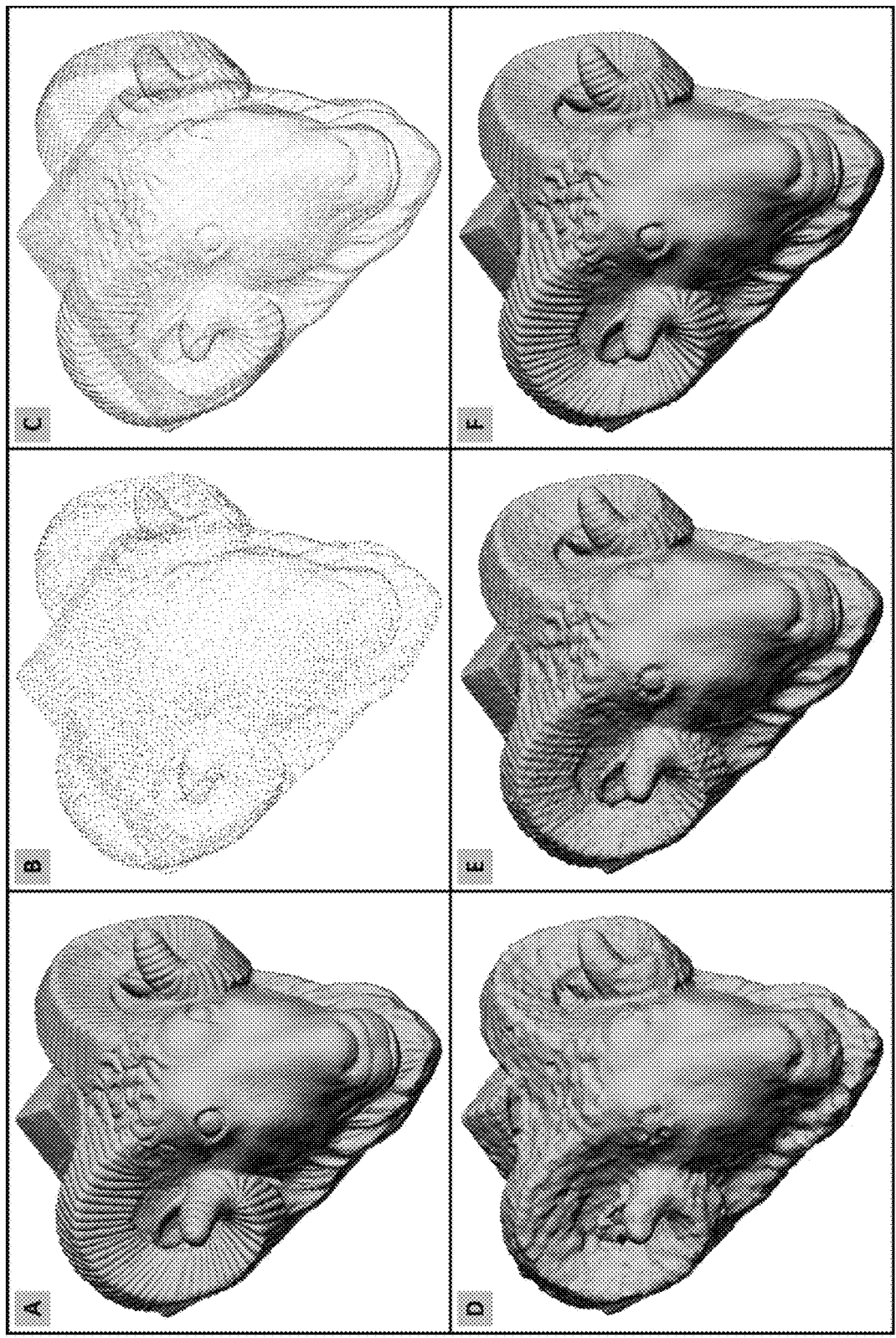
FIG. 10 is a series of images showing the results of the method for reconstructing a surface of an object.

In our implementation we leverage the octree data structure, which maintains a partition of the points as the cells are subdivided. We first construct a coarse octree, say of depth 4 or 5 using the scheme described above, specifying a maximum depth as an additional stopping criterion in addition to the plane model test. Then for each non-empty leaf cell of the octree, we choose one point contained within the cell and make it a member of S. In our implementation, we choose, amongst all the points contained in the cell, the one closest to the cell centroid. We call this process oriented point octree subsampling. The resulting subset S does not necessarily solve the problem, but we use it as a starting point. Referring to FIG. 10, a series of images showing the results of the method for reconstructing a surface of an object are illustrated, herein explained further: A 685K oriented points rendered by splatting; B: Octree-subsampled to 12,445 points at depth 7; C: Octree-subsampled to 185, 808 points at depth 9; and Dual-marching cubes NCH surfaces reconstructed with an octree of depth 9 from the result of octree subsampling at depth 6(D), depth 7(E), depth 9(F), and ignoring the remaining points. FIG. 10 shows an input data set with a large number of samples, several subsampled data sets generated with this process, and the surface reconstructions obtained over an octree of same depth from the different subsets. We can see that this octree-subsampling scheme by itself produces increasingly better approximations.

Then we repeat the following steps: 1) we evaluate the NCH Signed Distance $f_s(x)$ on all the remaining points of P; 2) if no point exceed the tolerance, we stop the process here; 3) otherwise we subdivide the octree to the next depth and perform the oriented point octree subsampling method described above on this refined octree. Of these samples, we only include in S those for which the function $f_s(x)$ exceeds the threshold. And then we iterate. No point can be chosen twice, since once they belong to S the value of the NCH Signed Distance function is zero. The process has to stop because in the worst case scenario all the points are included in S, in which case the maximum error is zero.

As points are added to the subset S we get a sequence of NCH Signed Distance functions $f_s(x)$. When we evaluate this sequence on a particular point we obtain a sequence of approximate distances from the point to the final surface. It is important to emphasize that this sequence is not necessarily monotonically decreasing, not even for the remaining points. However, it does converge to zero as denser subsets are considered, and in particular it becomes zero when the point is added to the subset.

Running time depends mainly on the number of points in the data set, the distribution of points in space, the depth of the octree, and whether the other options discussed are chosen or not. However, the algorithm the distance from each input point to the resulting NCH Surface is guaranteed to be within the specified maximum tolerance $\in$, when all the points are used to construct the NCH Signed Distance, the NCH Surface interpolates all the points. Most variational schemes cannot guarantee maximum tolerance.

Our C++ and Java implementation is cross-platform and includes all the options discussed herein. The experiments related to this invention were performed on an Apple MacBook Air with 4 GB of memory, an Intel i7 quad core processor, and 256 GB SSD drive. We used about 40 data sets covering a wide range point cloud sizes and geometric complexity using two sets of parameters; octree depth 9 with $\in = 10^{-3}$, and octree depth 10 with $\in = 10^{-4}$. The figures illustrate results in a variety of scenarios: evenly sampled surfaces with low noise (FIGS. 11 and 14), unevenly sampled surfaces with moderate noise (FIG. 12), unevenly sampled surfaces where the results are satisfactory (FIG. 13), and unevenly sampled surfaces with some outliers and uneven distribution of noise (FIG. 15). These experiments confirm the $O(N^2)$ complexity.

Figure 11:
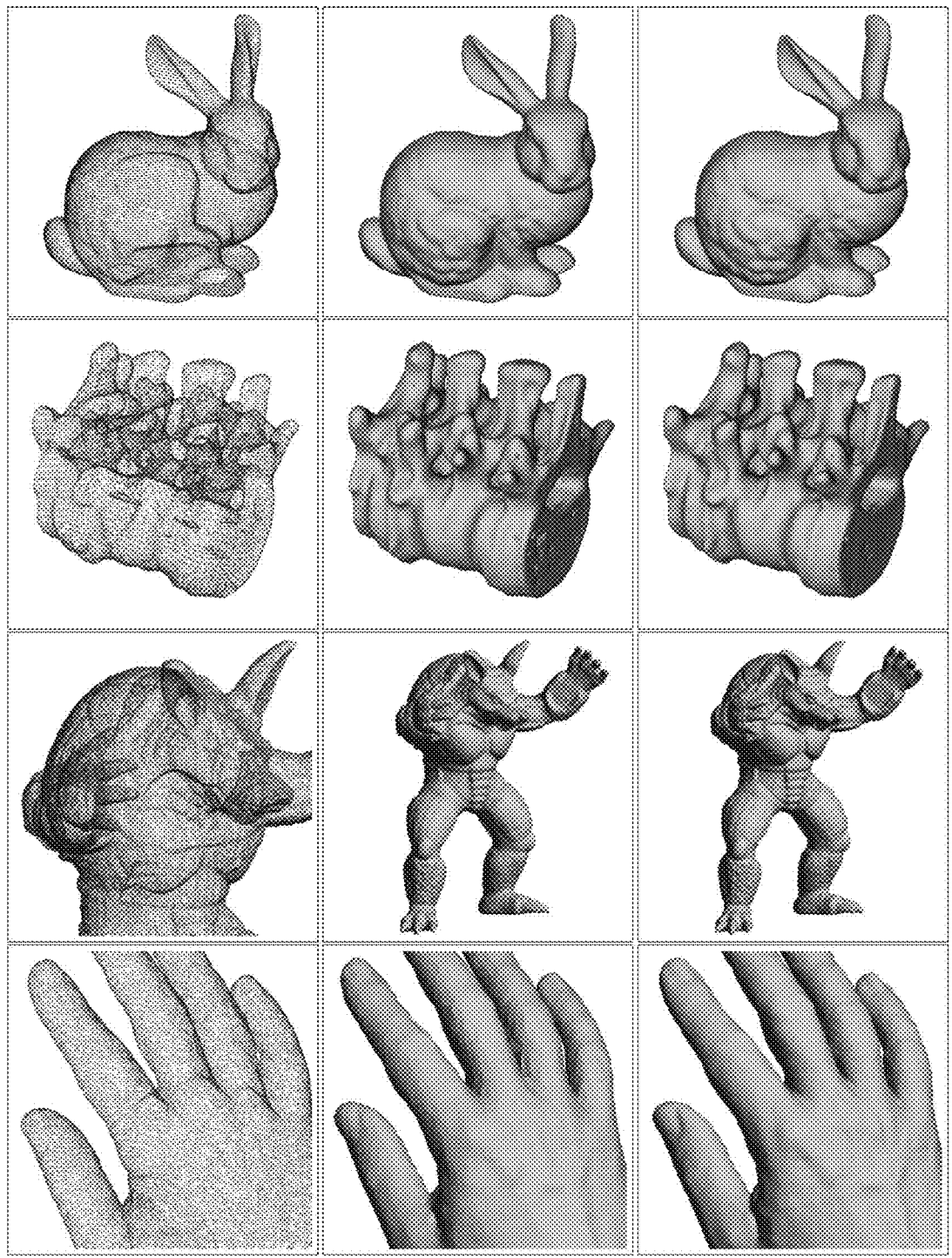
FIG. 11 is a series of images showing the results on evenly sampled low noise surfaces for the method of reconstructing a surface for different objects.

Referring to FIG. 11, a series of images showing the results on evenly sampled low noise surfaces for the method of reconstructing a surface for different objects are illustrated, herein explained further: Left: oriented points; Center: reconstruction with an octree of depth 9 and $\in=10^{-3}$; and Right: reconstruction with an octree of depth 10 and $\in=10^{-3}$.

Figure 12:
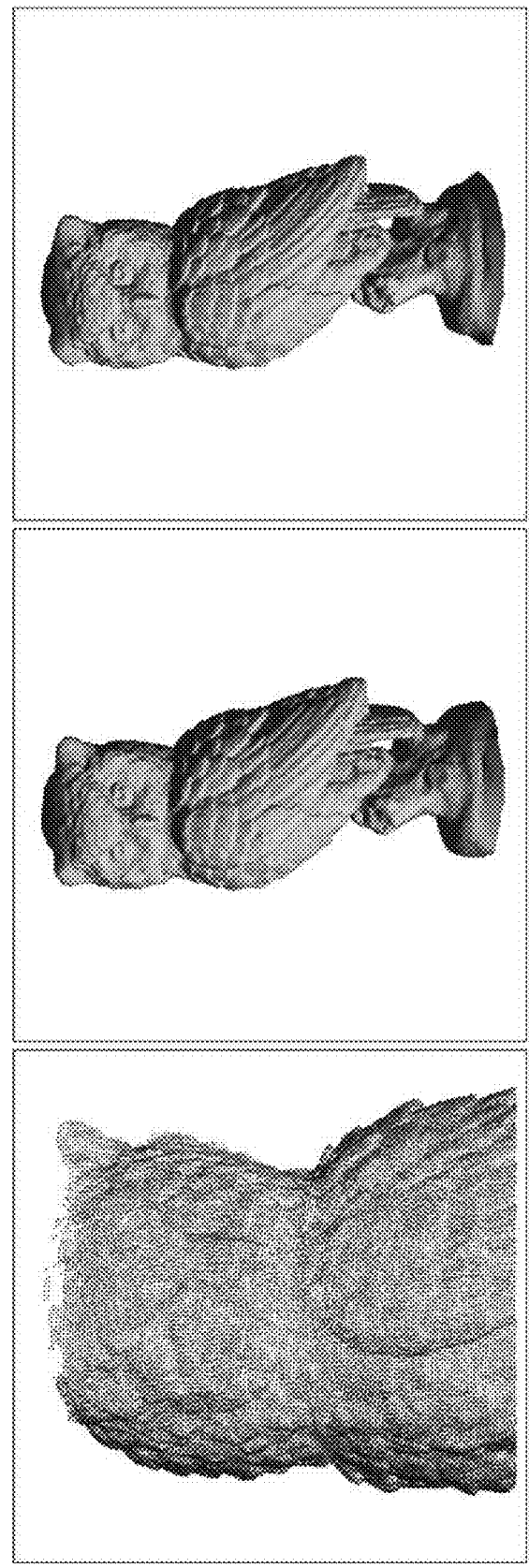
FIG. 12 is a series of images showing the results on data with moderate noise for the method of reconstructing a surface for an object.

Referring to FIG. 12, a series of images is provided showing the results on data with moderate noise for the method of reconstructing a surface for an object are illustrated, herein explained further: Left: oriented points; Center: reconstruction with an octree of depth 9 and $\in=10^{-3}$; and Right: reconstruction with an octree of depth 10 and $\in=10^{-3}$.

Figure 13:
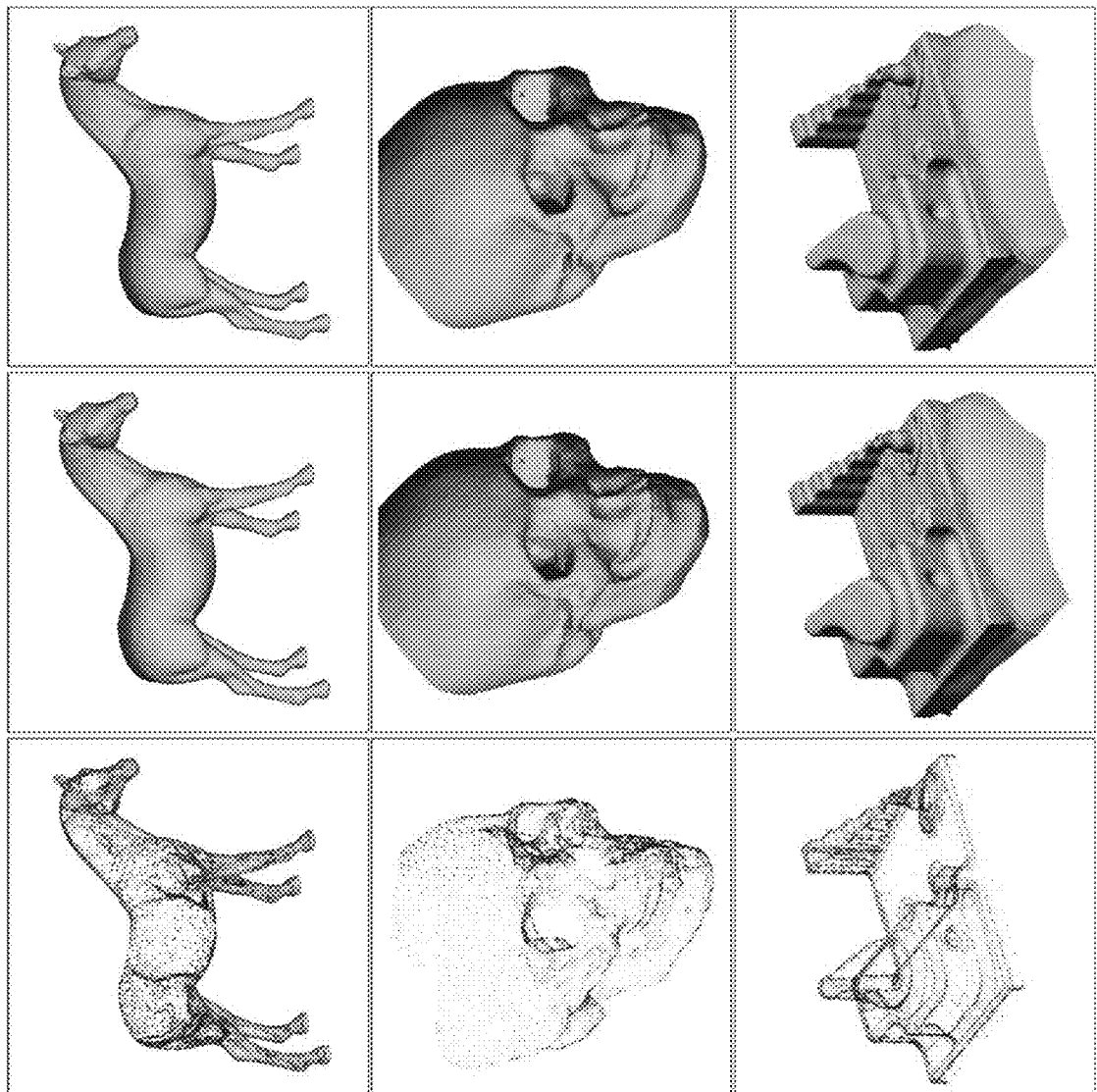
FIG. 13 is a series of images showing the results on evenly sampled surfaces for the method of reconstructing a surface for different objects.

Referring to FIG. 13, a series of images is provided showing the results on evenly sampled surfaces for the method of reconstructing a surface for different objects, herein explained further: Left: Oriented points; Center: reconstruction with an octree of depth 9 and $\in=10^{-2}$; and Right: reconstruction with an octree of depth 10 and $\in=10^{-3}$.

Figure 14:
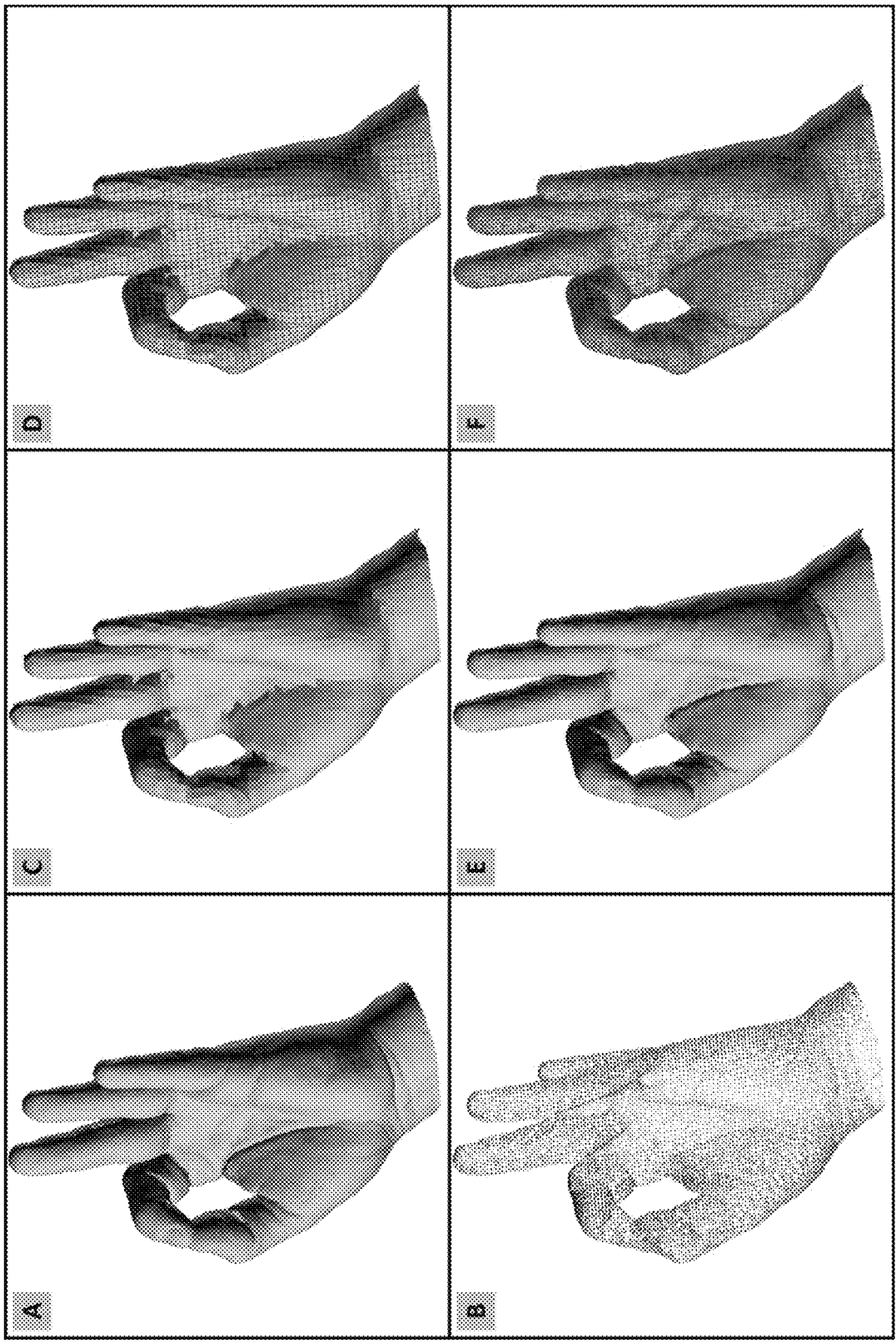
FIG. 14 is a series of images showing the results of the method for reconstructing a surface of an object.
Figure 15:
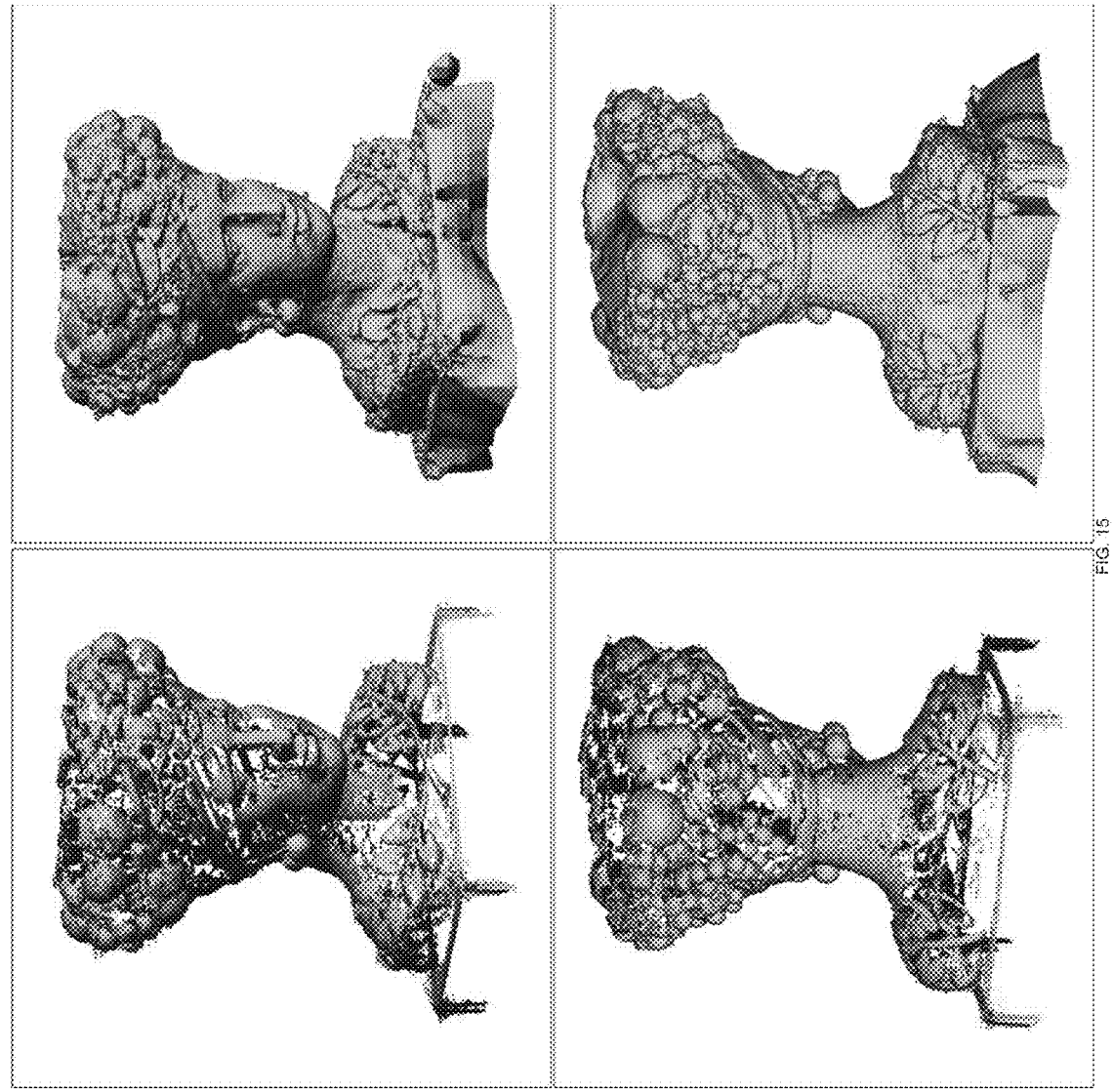
FIG. 15 is a series of images showing the results on data with uneven sampling and significant noise for the method of reconstructing a surface for different objects.

Referring to FIG. 14, a series of images is provided showing the results of the method for reconstructing a surface of an object, herein explained further: Results: Laurent Hand; A: 215,000 oriented points; B: octree-sampled to 23,405; C,D: reconstruction at depth 7; and E,F: reconstruction at depth 9. In both cases, $\in=10^{-4}$ and the NCH Signed Distance satisfies the constraint for all points.

Referring to FIG. 15, a series of images is provided showing the results on data with uneven sampling and significant noise for the method of reconstructing a surface for different objects; herein explained further: Left: Oriented points; Right: reconstruction with an octree of depth 10 and $\in=10^{-2}$.

In another embodiment, the invention is a device for reconstructing a surface of an object. By way of example, without limitation, the device is a program storage device readable by machine, tangibly embodying a program of instructions executable by the machine to perform the method steps above for reconstructing a surface of an object.

In another embodiment, the invention is an article of manufacture for reconstructing a surface of an object. By way of example, without limitation, the article is a computer readable medium having computer readable program code means embodied thereon. The computer readable program code means comprising the method steps above for reconstructing a surface of an object.

Results have been obtained with sequential single-threaded algorithms implemented both in Java and in C++. In particular, the computation is performed on a multi-core processor. It is also contemplated that software having multi-threaded implementations will be used to double or quadruple the performance. In fact, the algorithms described above are ideally suited for massively parallel architectures such as those found in GPUs. Once the parameters $\rho_i^+$ and $\rho_i^-$ are determined, the NCH function $f(x)$ has to be evaluated at various points, and all these evaluations are independent of each other. Since computing the minimum or maximum of a set of N numbers requires O(log N) time in O(N) procesors, computing both the parameters $\rho_i^+$ and $\rho_i^-$, and the function evaluations can be sped up quite significantly. If the number of octree cells or vertices is O(N), then the overall cost reduces to O(N log N) in O(N) processors.

The NCH Surface representation $N=\{(p_i,n_i,\rho_i^+,\rho_i^-):i=1, \ldots, N\}$ introduced above is practical as a surface representation and has a lot of representation power We have explored the NCH Surface representation as a global description of an oriented point cloud. Perhaps a more practical application of this representation is as a local description of a shape. Sine the implicit function $f(x)$ defined by N is globally defined, we need to add a way of limiting the scope of the representation. We can do this with a smooth nonnegative function $\varphi(x)$ which is equal to 1 in the neighborhood of the region well represented by the NCH Signed Distance function, equal to 0 further away, and smoothly transitioning in between. We can combine many of these local surface description into a partition of unity approach. But since these NCH Surfaces have much more local description power than quadratic patches, based upon information and belief, a space covering comprising a lot fewer and rather large weight function support regions will produce excellent results.

We have introduced a new surface representation and presented a new simple algorithm to reconstruct a watertight surface from a finite set of oriented points. The half-space associated with this function generalizes the Convex Hull in such a way that concavities can be represented and approximated. Since our goal was to produce simple and practical algorithms, as in many other surface reconstruction algorithms, we evaluate the NCH Signed Distance on the vertices of a volumetric hexahedral grid, and generate an approximating polygonal mesh using an isosurface algorithm. We have also proposed strategies to reduce the computational cost by generating adaptive polygon meshes and by subsampling. Despite their simplicity, these algorithms produce high quality polygon meshes competitive with those produced by state-of-the-art algorithms. Even though our current implementations are sequential, the algorithms are massively parallelizable, and we plan to produce GPU implementations in the near future. In addition, to reconstruct surfaces from very large oriented point clouds, the subsampling strategy can be used to generate good starting points for iterative algorithms.

The invention of FIGS. 1-15 may operate on a computer system which includes one or more application programs. The application programs operate on a computer platform that includes a hardware unit. One application program that runs on the system is the present method.

For example, without limitation, the hardware unit includes one or more central processing units (CPU), a random access memory (RAM), and an input/output interface. Micro-instruction code, for instance a reduced instruction set, may also be included on the platform. Various peripheral components may be connected to the computer platform including a graphical interface or terminal, a data storage device, and a printing device. An operating system coordinates the operation of the various components of the computer system. It is readily understood that those skilled in the computer arts will be familiar with many equivalent computer systems.

Embodiments of the present invention may also include one or a multitude of internet based servers, and computer software, including internet web page based code, and methods of application for providing the user with an internet based service. Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", or "system". Furthermore, aspects of the present invention may take the form of a computer program product embodied in one or more computer readable medium(s) having computer readable program code embodied thereon.

Embodiment of the present invention may operate on a network for implementing a system for providing specialist services in underserved areas. By way of example, the system can be employed in conjunction with a computer-based system, where the elements can be implemented in hardware, software, firmware, or combinations thereof. Network may include workstations and intermediary workstations. Each of the workstations may be configured to communicate with an application server via internet connections. The server may include processors and memory for hosting different modules, which are described in more detail above with respect to the detailed description of the exemplary implementation. Information or profiles can be stored in a database.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A program storage device, comprising:
   a memory storing instructions; and
   at least one hardware processor to execute the instructions to:
   sample a boundary surface of the object to obtain a data set, the data set comprises oriented points including sample point locations associated with orientation vectors;
   estimate non-convex hull signed distance function parameters from the data set, the estimating further comprising the steps of:
   a. associating a set of curvature parameters with the oriented points;
   b. selecting a first oriented point of the data set, the first oriented point including a first sample point location, and a first orientation vector, the first oriented point having an associated first curvature parameter;
   c. initializing the first curvature parameter to zero;
   d. selecting a second oriented point of the data set, the second oriented point being different from the first oriented point, the second oriented point including a second sample point location, and a second orientation vector;
   e. computing a first displacement vector from the first sample point location to the second sample point location;
   f. computing a first temporary parameter as an inner product of the first orientation vector and the first displacement vector;
   g. computing a second temporary parameter as a square norm of the first displacement vector;
   h. computing a third temporary parameter as a result of subtracting the product of the first curvature parameter times the second temporary parameter, from the first temporary parameter;
   i. if the third temporary parameter is larger than zero, making the first curvature parameter equal to the result of dividing the first temporary parameter by the second temporary parameter;
   j. repeating steps d. to i. until every second oriented point has been selected; and
   k. repeating steps b. to j. until every first oriented point has been selected;
   evaluate the non-convex hull signed distance function on vertices of a volumetric mesh; and
   approximate a zero level set of the non-convex hull signed distance function by a polygonal mesh using an iso-surface algorithm.

2. The program storage device of claim 1, wherein the surface is a smooth oriented, watertight surface.

3. The program storage device of claim 1, wherein the data set is a finite set.

4. The program storage device of claim 1, wherein the data set is an infinite set.

5. The program storage device of claim 1, wherein the step of evaluating further comprises the steps of:
   a. selecting a first vertex of the volumetric mesh;
   b. setting a first vertex evaluation value to negative infinity;

c. selecting a third oriented point of the data set, the third oriented point including a third sample point location, and a third orientation vector, the third oriented point having an associated third curvature parameter from a set of curvature parameters;
d. computing a second displacement vector from the first vertex to the third sample point location;
e. computing a fourth temporary parameter as the inner product of the third orientation vector and the second displacement vector;
f. computing a fifth temporary parameter as the square norm of the second displacement vector;
g. computing a sixth temporary parameter as the result of subtracting the product of the third curvature parameter times the fifth temporary parameter, from the fourth temporary parameter;
h. if the sixth parameter is larger than the first vertex evaluation value, making the first vertex evaluation value equal to the sixth parameter;
i. repeating steps c. to h. until every third oriented point has been selected; and
j. repeating steps a. to i. until every first vertex of the volumetric mesh has been selected.

6. The program storage device of claim 1, wherein a geometry of the reconstructed surface is independent of a reversal of the orientation vector.

7. The program storage device of claim 1, wherein the associated orientation vectors are consistently oriented either towards the outside or towards the inside of the object.

8. The program storage device of claim 1, wherein the volumetric mesh is a regular volumetric mesh.

9. The program storage device of claim 1, wherein the volumetric mesh is an adaptive volumetric mesh.

10. The program storage device of claim 1, wherein the volumetric mesh is a regular voxel grid.

11. The program storage device of claim 1, wherein the volumetric mesh is an octree.

12. The program storage device of claim 1, wherein the isosurface algorithm used is Marching Cubes Algorithm.

13. The program storage device of claim 1, wherein the isosurface algorithm used is Dual Marching Cubes Algorithm.

14. The program storage device of claim 1, wherein the data set is obtained using an adaptive subsampling method by interpolating a subset of the oriented points and approximating remaining oriented points under defined maximum error.

15. The program storage device of claim 1, wherein the data set is acquired using optical measuring devices.

16. The program storage device of claim 1, wherein the data set is acquired using multi-view stereo reconstruction.

17. The program storage device of claim 1, wherein the orientation vectors are computed by independent measurements provided by a sensor.

18. The program storage device of claim 1, wherein the orientation vectors are computed using neighboring sample point locations.

19. The program storage device of claim 1, wherein the orientation vectors are computed using neighboring sample point locations and locations of sensors.

20. The program storage device of claim 1, wherein the step of estimating further comprises the steps of:
    a. associating a set of positive curvature parameters and a set of negative curvature parameters with the oriented points;
    b. selecting a first oriented point of the data set, the first oriented point including a first sample point location, and a first orientation vector, the first oriented point having an associated first positive curvature parameter, and an associated first negative curvature parameter;
    c. initializing the first positive curvature parameter and the first negative curvature parameter to zero;
    d. selecting a second oriented point of the data set, the second oriented point being different from the first oriented point, the second oriented point including a second sample point location, and a second orientation vector;
    e. computing a first displacement vector from the first sample point location to the second sample point location;
    f. computing a first temporary parameter as an inner product of the first orientation vector and the first displacement vector;
    g. computing a second temporary parameter as a square norm of the first displacement vector;
    h. computing a third temporary parameter as a result of subtracting the product of the first positive curvature parameter times the second temporary parameter, from the first temporary parameter;
    i. if the third temporary parameter is larger than zero, making the first positive curvature parameter equal to the result of dividing the first temporary parameter by the second temporary parameter;
    j. computing a fourth temporary parameter as a negative of the first temporary parameter;
    k. computing a fifth temporary parameter as a result of subtracting the product of the first negative curvature parameter times the second temporary parameter, from the third temporary parameter;
    l. if the fifth temporary parameter is larger than zero, making the first negative curvature parameter equal to the result of dividing the third temporary parameter by the second temporary parameter;
    m. repeating steps d. to l. until every second oriented point has been selected; and
    n. repeating steps b. to m. until every first oriented point has been selected.

* * * * *